June 9, 1931.   R. G. WILLIAMS   1,809,094
POLE ATTACHMENT FOR ELECTRIC CONDUCTORS
Filed June 13, 1928
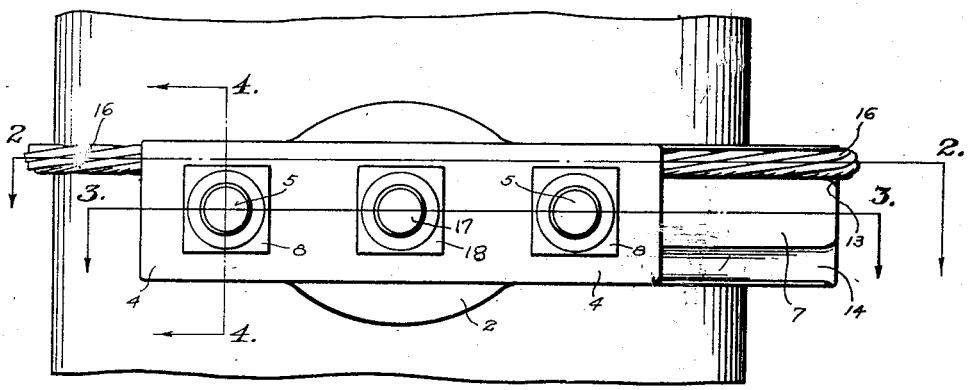
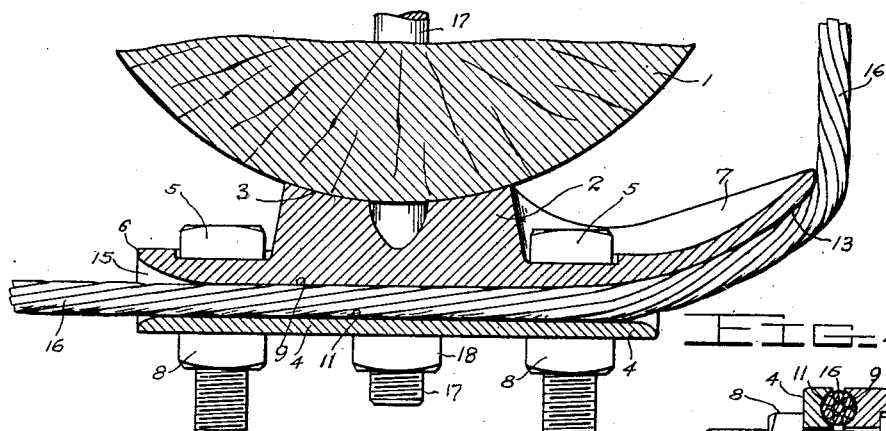
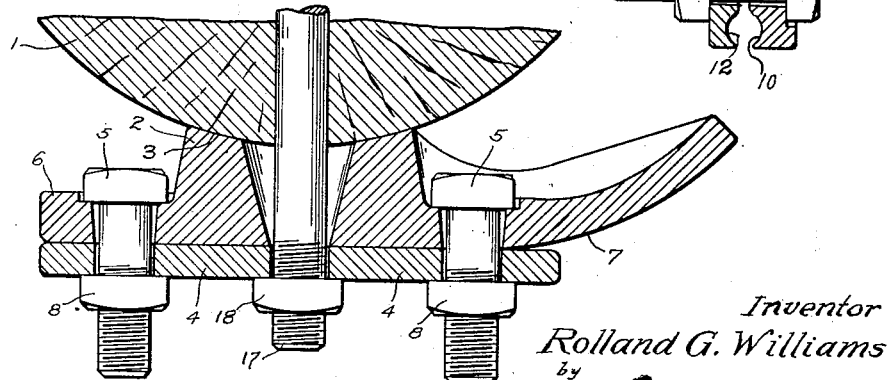
Inventor
Rolland G. Williams
Attorney Patented June 9, 1931

1,809,094

UNITED STATES PATENT OFFICE

ROLLAND G. WILLIAMS, OF BRANFORD, CONNECTICUT, ASSIGNOR TO MALLEABLE IRON FITTINGS COMPANY, OF BRANFORD, CONNECTICUT, A CORPORATION OF CONNECTICUT

POLE ATTACHMENT FOR ELECTRIC CONDUCTORS

Application filed June 13, 1928. Serial No. 285,193.

This invention relates to pole fixtures such as are utilized for the purpose of supporting electric cables, but more particularly has reference to a device of this description for use on poles that are located at a corner or at a place where the electrical cable and the messenger cable that supports it are bent at right angles or thereabouts.

The object of the invention is to provide a fixture that will readily adapt itself to the pole, and is capable of properly supporting the messenger cable whether the angular turn is to the right or to the left, with no danger whatever of the strands in the cable chafing against the fixture and becoming worn through.

The accompanying drawings show one of the preferred embodiments of this invention, and in these drawings Figure 1 is a front elevation of the fixture installed on a pole the latter being broken away—

Figure 2 is a section at the line 2—2 of Figure 1—

Figure 3 is a section at the line 3—3 of Figure 1, and

Figure 4 is a section at the line 4—4 of Figure 1.

Similar numerals of reference denote like parts in the several figures of the drawings.

1 is the pole, 2 is the base portion of the fixture which has its inner face slightly concave as shown at 3 so as to closely conform to the pole, and 4 is a clamping bar which is secured to the outer face of the base portion by means of bolts 5 passed from the rear through openings in lateral extensions 6, 7, of the base portion 2 and through the ends of the clamping bar 4, nuts 8 being driven on the free ends of these bolts to secure the clamp bar firmly to the face of the base portion 2.

In the outer face of the base portion are parallel grooves 9, 10, extending horizontally and lengthwise of the base and similar parallel grooves 11, 12, are formed within the inner face of the clamping bar 4, and when the latter is applied to the outer face of the base the grooves in the clamping bar will be opposite those in said base.

One lateral extension 7 of the base portion is extended beyond the clamping bar 4 and the grooves throughout this extension are curved continuations of the grooves in the face of the base portion, and these curved grooves are denoted by the numerals 13, 14.

The grooves in the end of the extension 6 may be slightly curved, as shown at 15 in the instance of one of the grooves at Figure 2.

The messenger cable 16 is clamped within the upper grooves between the base portion 2 and bar 4 by means of the bolts and nuts heretofore described, and this cable is bent around at substantially right angles, as shown at Figure 2, and throughout the extent of its bending conforms closely to the curved portion of the groove in the extension 7, so that it will be clear that there are no angular points on the clamping members against which the strands of the cable may be bent.

Since there is more or less swaying and bending of the cable at the other end of the fixture the grooves in the extension 6 are slightly curved as shown in the instance of the groove 15, and it will therefore be clear that there can be no contact of any part of the fixture with the cable such as would tend to chafe or rupture the strands of such cable.

The proper position of the cable is within the upper grooves 9, 11, of the base portion and clamping bar as shown at Figure 4, and when the bending of the cable is in a direction opposite to that shown at Figure 2, the fixture is simply turned around, and the cable would then be secured within the grooves 10 and 12, which, in this reverse position, become the upper grooves. It is always necessary that the cable be held within the upper grooves so that the general line of the messenger cable may not be changed, and also that the general line of the electrical conductor, which is suspended in the usual manner from the messenger cable, may likewise be unchanged.

It is absolutely necessary that, the messenger cable, at the point where it is turned at substantially right angles, should have an extended curved support, and that it should be securely bolted to the base portion 2 at the point where said curve begins, for otherwise the cable would buckle and would swing the clamping bar 4 around the bolt 17 as a pivotal point.

The fixture is secured to the pole by means of a bolt 17 passed through the pole with a nut 18 driven on its free end against the clamping bar.

What is claimed is:—

A clamp fixture for a pole, comprising a base portion and a clamping bar, the outer face of said portion and the inner face of said bar provided with horizontally extending and corresponding grooves that are spaced one above the other, a messenger cable housed within the upper pair of said grooves, a centrally located bolt and nut for clamping said base and bar together and securing them to said pole, said base having at one end a curved extension beyond the clamping bar and curved grooves therein which are continuations of the aforesaid spaced grooves, and clamping bolts extending through said base and bar at points near the ends of said bar, the bolt adjacent said extension being located at the point where the curve of said extension begins.

In testimony whereof I affix my signature hereto.

ROLLAND G. WILLIAMS.